No. 727,094. PATENTED MAY 5, 1903.
J. W. CONNETT.
CHURN.
APPLICATION FILED JUNE 18, 1902.
NO MODEL.
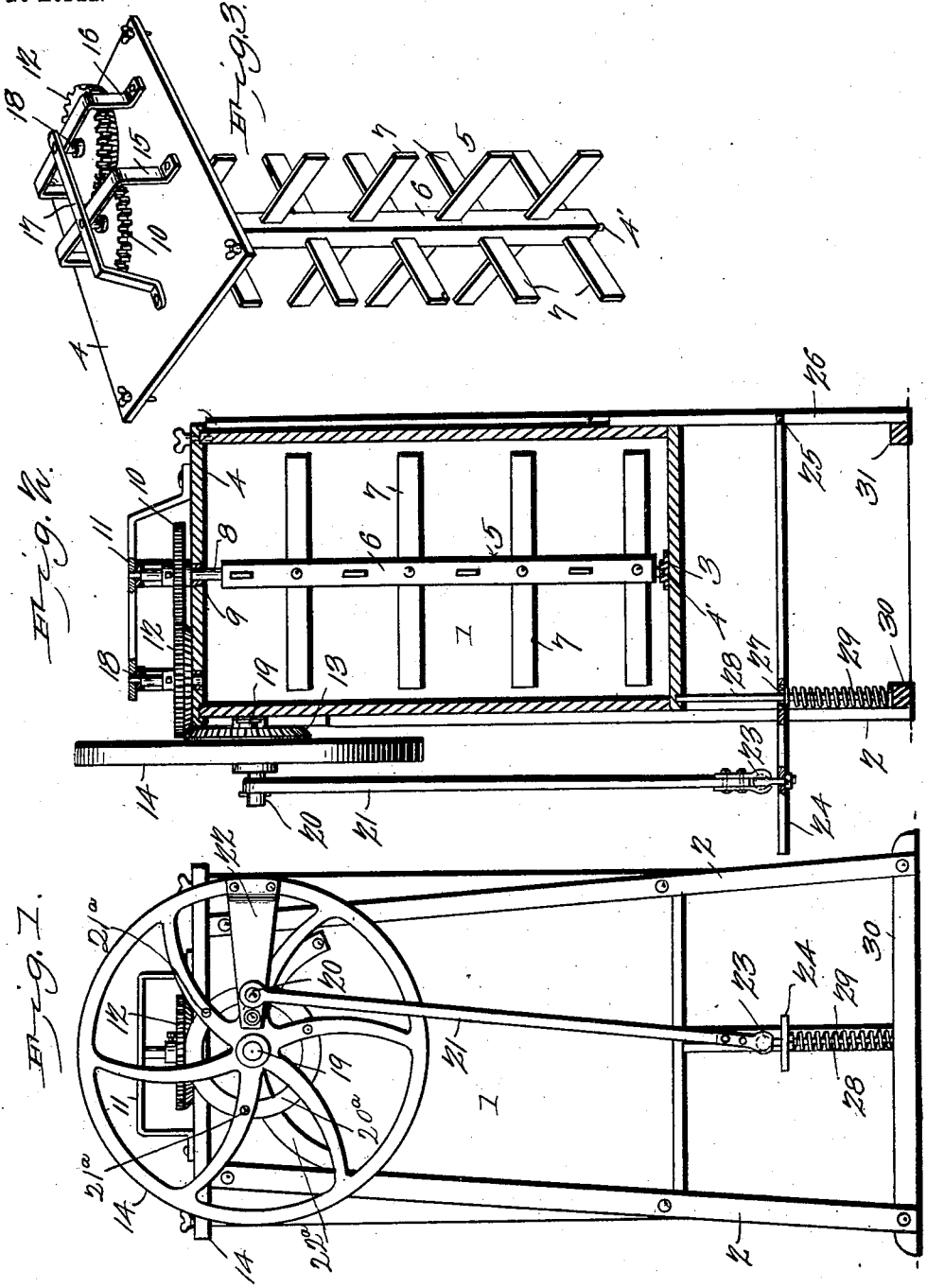
Witnesses
J. W. Connett, Inventor.
by C. A. Snow & Co
Attorneys No. 727,094. Patented May 5, 1903.

UNITED STATES PATENT OFFICE.

JOHN W. CONNETT, OF PAWNEE STATION, KANSAS.

CHURN.

SPECIFICATION forming part of Letters Patent No. 727,094, dated May 5, 1903.

Application filed June 18, 1902. Serial No. 112,236. (No model.)

*To all whom it may concern:*

Be it known that I, JOHN W. CONNETT, a citizen of the United States, residing at Pawnee Station, in the county of Bourbon and State of Kansas, have invented a new and useful Churn, of which the following is a specification.

The invention relates to improvements in churns.

The object of the present invention is to improve the construction of churns and to provide a simple and comparatively inexpensive one capable of rapidly producing butter and adapted to be operated by foot-power and by a simple downward pressure, thereby making the work light and easy.

The invention consists in the construction and novel combination and arrangement of parts hereinafter fully described, illustrated in the accompanying drawings, and pointed out in the claim hereto appended.

In the drawings, Figure 1 is a side elevation of a churn constructed in accordance with this invention. Fig. 2 is a vertical sectional view of the same. Fig. 3 is a detail perspective view of the cover or lid of the churn-body and the dasher-shaft which is carried by the same.

Like numerals of reference designate corresponding parts in all the figures of the drawings.

1 designates a churn-body provided with suitable legs 2 and having a cover 4, which may be secured to the churn-body in any desired manner. The churn-body is provided at its bottom with a centrally-arranged bearing 3 to receive a lower pivot or journal of a dasher 5, and the latter consists of a central stem 6 and a series of blades 7, arranged at right angles to each other and disposed at regular intervals, as clearly shown in Figs. 2 and 3; but any other desired arrangement of blades may be employed.

The stem of the dasher is provided with an extension 8, arranged in a bearing 9 of the cover and passing through the same and having a gear-wheel 10 keyed or otherwise secured to it. The outer end of the stem 10 is journaled in a suitable bearing of a frame 11, and the gear-wheel 10 meshes with a similar horizontal gear-wheel 12, which projects slightly beyond the edge of the cover and which meshes with teeth 13 of a combined crank and fly wheel 14. The teeth of the gear-wheels may be either bevel or straight spur-teeth, and when the wheel 14 is rotated by the means hereinafter described motion will be communicated to the dasher, and the rotation of the latter will rapidly agitate the contents of the churn-body and quickly produce butter. This arrangement of gearing also permits the cover and the dasher to be readily removed from the churn-body without detaching the operating mechanism.

The frame 11 is composed of bars 15, 16, and 17. The bars 15 and 16 are arranged parallel with each other and are bent into approximately rectangular form over the gear-wheels 10 and 12, and their terminals are bent outward to form feet and are perforated for the reception of fastening devices for securing them to the cover. The bar 17, which is approximately L-shaped, connects the bars 15 and 16 and is secured to the cover to form a brace. The gear-wheel 12 is mounted on a vertical shaft 18, which is journaled in the cover and in a suitable bearing of the bar 16 of the frame 11.

The combined fly and crank wheel is journaled on a stub-shaft 19, and it is provided with a wrist-pin 20, which is connected to the upper end of a pitman 21. The wrist-pin is preferably mounted upon a removable or separate plate 22, of approximately sector shape, riveted or otherwise secured to the wheel. This sector-shaped plate, it will be observed, connects the hub of the fly-wheel with the rim of said wheel upon the outer side of the latter, the gear-section $20^a$ of said wheel being secured, by means of pins or rivets $21^a$, to the inner side of the wheel adjacent to the churn-body and in such a manner as to mesh with the teeth of the gear-wheel 12. The stub-axle 19, upon which the combined fly, crank, and gear wheel is journaled, has a support upon the upper side of an arch or brace $22^a$, secured upon the side of the churn-body and extending between the legs or uprights 2 2. By this construction the fly-wheel and its attachments are very firmly supported, and the pitman 21, instead of being connected at its upper end directly to the fly-wheel or to the gear-section $20^a$, is pivotally connected with the sector-shaped plate 22, thus enabling the pivotal connection to be made at any desired distance from the center of the wheel and also enabling the said pitman to be set out from the body of the churn to a point where it cannot by any possibility rub against and interfere with the rotation of the fly-wheel. The lower end of the pitman 21 is connected by a swivel-joint 23 with a foot-lever 24, fulcrumed at its rear end 25 at the back of the churn to a suitable support 26 and provided near its front end with an opening 27. A guide 28, consisting of a rod, extends through the opening 27 and has a coiled spring 29 disposed on it and interposed between the lever and a bottom connecting-bar 30 and adapted to lift the foot-lever after the same has been forced downward by the operator, thereby rendering the work of operating the churn light and easy. The support 26 preferably consists of a vertical bar secured to the rear of the churn-body and to a connecting-bar 31. The connecting-bars 30 and 31 are secured to the lower ends of the legs 2 of the churn-body, as clearly shown in Figs. 1 and 2.

It will be seen that the churn is exceedingly simple and inexpensive in construction, that it is easily operated, and that after the operation of churning has been completed the cover and the dasher may be readily lifted from the churn-body without removing the operating mechanism.

What I claim is—

The combination of a churn-body, legs supporting the same, an arched cross-piece disposed between said legs, a stub-axle supported by said arch, a fly-wheel mounted on said stub and having a concentric gear-section on its inner face, a sector-plate connecting the hub and the rim of the fly-wheel upon the outer face of the latter, a pitman connecting a wrist-pin upon said sector-plate with a spring-supported treadle, a detachable cover carrying a revoluble dasher, a gear-wheel upon the stem of said dasher, and intermediate gear meshing with the gear upon the dasher-stem and also with the gear-section upon the inner face of the fly-wheel.

In testimony that I claim the foregoing as my own I have hereto affixed my signature in the presence of two witnesses.

JOHN W. CONNETT.

Witnesses:
B. HUDSON,
J. M. HUMPHREY.